United States Patent
Otsuka

Patent Number: 5,493,395
Date of Patent: Feb. 20, 1996

[54] WAVELENGTH VARIATION MEASURING APPARATUS

[75] Inventor: Masaru Otsuka, Yokohama, Japan

[73] Assignee: Canon Kabushiki Kaisha, Tokyo, Japan

[21] Appl. No.: 436,598

[22] Filed: May 8, 1995

Related U.S. Application Data

[63] Continuation of Ser. No. 352,213, Dec. 2, 1994, abandoned, which is a continuation of Ser. No. 877,141, May 1, 1992, abandoned.

[30] Foreign Application Priority Data

May 2, 1991 [JP] Japan ................................ 3-130614

[51] Int. Cl.⁶ ............................................... G01B 9/02
[52] U.S. Cl. ........................ 356/349; 356/351; 356/358
[58] Field of Search ................................. 356/346, 349, 356/351, 355, 357, 358

[56] References Cited

U.S. PATENT DOCUMENTS

| | | | |
|---|---|---|---|
| 3,877,813 | 4/1975 | Hayes et al. | 356/106 |
| 4,160,184 | 7/1979 | Ljung | 356/350 X |
| 4,215,938 | 8/1980 | Farrand et al. | 356/358 |
| 4,538,911 | 9/1985 | Heynacher et al. | 356/358 |
| 4,820,047 | 4/1989 | Snyder | 356/349 |
| 4,907,886 | 3/1990 | Dandliker | 356/349 |
| 4,991,962 | 2/1991 | Jain | 356/349 |
| 5,106,191 | 4/1992 | Ohtsuka | 356/349 |
| 5,148,076 | 9/1992 | Albers et al. | 356/350 X |

FOREIGN PATENT DOCUMENTS

| | | |
|---|---|---|
| 2582807 | 12/1986 | France . |
| WO8808519 | 11/1988 | WIPO . |
| WO9011492 | 10/1990 | WIPO . |
| WO9102214 | 2/1991 | WIPO . |

Primary Examiner—James C. Housel
Assistant Examiner—Harold Y. Pyon
Attorney, Agent, or Firm—Fitzpatrick, Cella, Harper & Scinto

[57] ABSTRACT

A wavelength variation measuring apparatus is disclosed. A light beam from a light source device capable of controlling an oscillation wavelength is divided into two light beams by a light divider. A predetermined optical path length difference is imparted to the divided light beams to synthesize the beams by a light synthesizer. A part of the synthesized light is used as detection light and the rest of the synthesized light is used as measuring light. A beat signal is detected from the detection light by a photodetector. A feedback control is effected to the light source device by use of the beat signal to thereby stabilize the oscillated wavelength of the light source device and to direct the measuring light to an object to be measured. The beat signal is rendered as a measurement data correction signal, and measurement data obtained by directing the measuring light to the object to be measured is corrected.

15 Claims, 6 Drawing Sheets

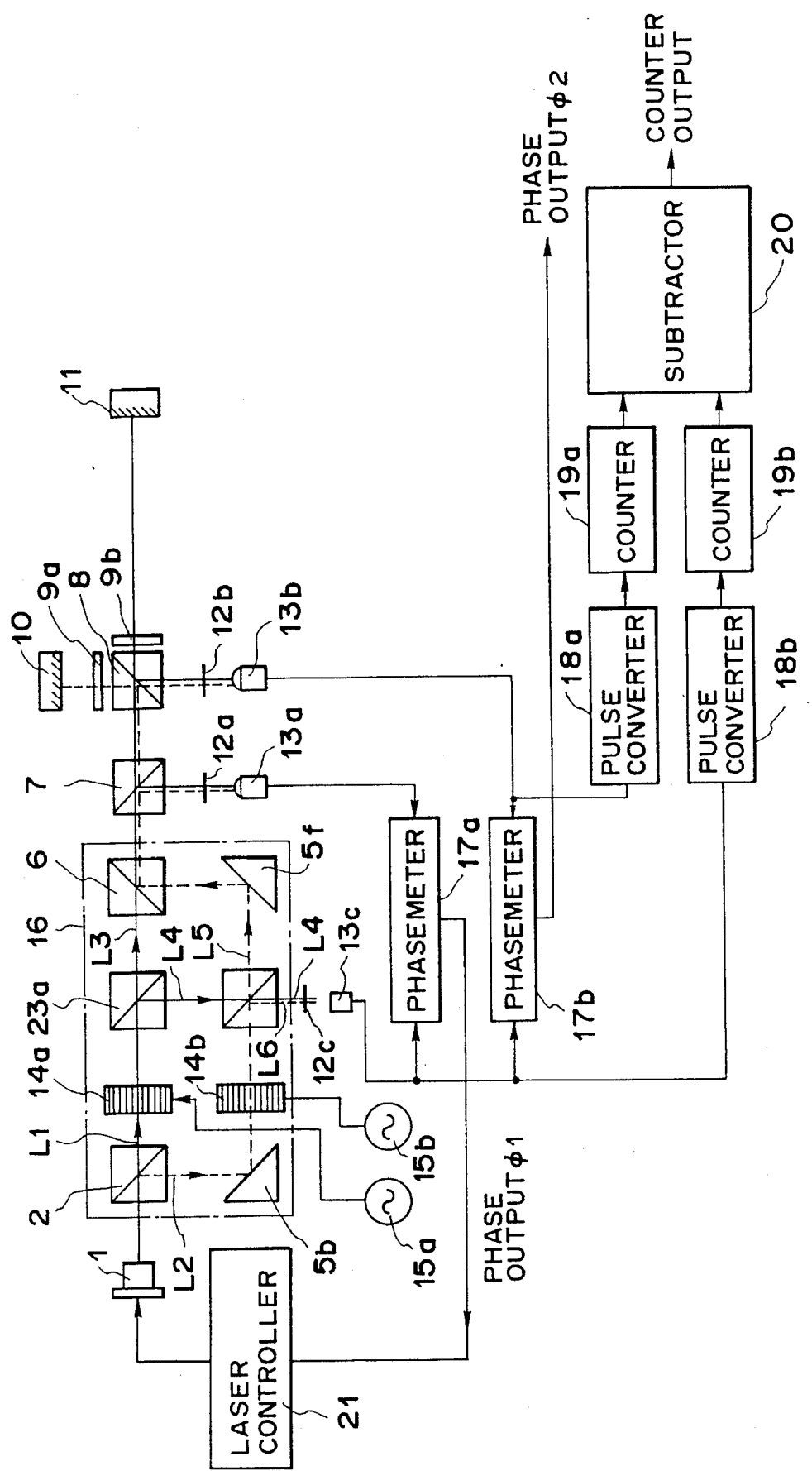

WAVELENGTH VARIATION MEASURING APPARATUS

This application is a continuation of application Ser. No. 08/352,213, filed Dec. 2, 1994, now abandoned, which is a continuation of application Ser. No. 07/877,141, filed May 1, 1992, abandoned.

BACKGROUND OF THE INVENTION

1. Field of the Invention

This invention relates to a wavelength variation measuring apparatus for measuring any variation in an oscillated wavelength, for example, from a laser source, and particularly to a wavelength variation measuring apparatus suitable for application to an interference apparatus for measuring physical amounts such as the length, shape, speed and refractive index of an object to be measured with the wavelength of laser light as a reference.

2. Related Background Art

A light heterodyne interference apparatus is known as an interference apparatus capable of detecting the length shape, etc. of an optical member such as a lens or a mirror relatively highly accurately by the utilization of light wave interference.

FIG. 1 of the accompanying drawings is a schematic view of the essential portions of a light heterodyne interference apparatus according to the prior art which utilizes a laser source and an AD modulator.

In FIG. 1, laser light (frequency $f_0$) emitted from a laser source 51 is divided into two light beams by a polarizing beam splitter 52. The frequency shift of an incident light beam is effected by AO modulators 53 and 54 disposed in the optical paths of the divided two light beams. Thereby there are obtained two light beams of frequency $f_0+f_1$ and frequency $f_0+f_2$, respectively. The two light beams subjected to the frequency shifting are synthesized by a polarizing beam splitter 56, whereby the combined light beam is directed as a light beam for light heterodyne measurement including two light beams slightly differing in frequency to an object to be measured through a mirror 55.

Also, as light wave interference, the fluctuation of an oscillated wavelength from light source means greatly affects measurement accuracy. It is therefore important to achieve the stabilization of the oscillated wavelength.

FIG. 2 of the accompanying drawings is a block diagram of the essential portions of an interference apparatus which is proposed in U.S. Pat. No. 4,907,886 wherein the stabilization of the oscillated wavelength of laser light from a laser source is achieved.

In FIG. 2, laser light from a laser source 70 is divided into two light beams by a light divider 73. The two light beams are caused to enter two interferometers 71 and 72 disposed in parallel. With one interferometer 72 as a reference interferometer, a variation in the phase of an output from a phase portion 75 is fed back to the laser source 70. Thereby the oscillated wavelength from the laser source 70 is stabilized and the wavelength of the laser light entering the other interferometer 71 is stabilized. However, in the light heterodyne interference apparatus of FIG. 1, it is a premise that the oscillated wavelength of the laser source itself is stable. It has therefore been necessary to endow the laser source itself with the wavelength stabilizing function in precise measurement using the wavelength of laser light as a reference.

Particularly where a semiconductor laser is used as a laser source, it has been necessary to effect control by the use of a highly accurate temperature control device or an expensive optical element such as an etalon. This has led to the problem that the light source unit becomes bulky and complicated.

Also, in the interference apparatus shown in FIG. 2, a reference interferometer exclusively for use for stabilizing the oscillated wavelength from the laser source is required, and this also has led to the problem that the entire apparatus becomes bulky and complicated.

SUMMARY OF THE INVENTION

The present invention has as its object the provision of a wavelength variation measuring apparatus suitable for an interference apparatus capable of accomplishing highly accurate light wave interference, and the wavelength variation measuring apparatus of the present invention is characterized in that a light beam from light source means whose oscillated wavelength is controllable is divided into two light beams by a light divider, a predetermined optical path length difference is imparted to said two light beams through optical path length difference imparting means, whereafter the two light beams are synthesized by a light combining device, part of the synthesized light is used as detection light and the rest of the synthesized light is used as measuring light, a beat signal is detected from said detection light by a photoelectric detector, and by the use of said beat signal, feedback control is effected to said light source means to thereby stabilize the oscillated wavelength and direct said measuring light to an object to be measured, or with said beat signal as a measurement data correction signal, measurement data obtained by directing said measuring light to the object to be measured is corrected.

BRIEF DESCRIPTION OF THE DRAWINGS

FIG. 6 is a schematic diagram of the essential portions of a fourth embodiment of the present invention.

DESCRIPTION OF THE PREFERRED EMBODIMENTS

Figure 1:
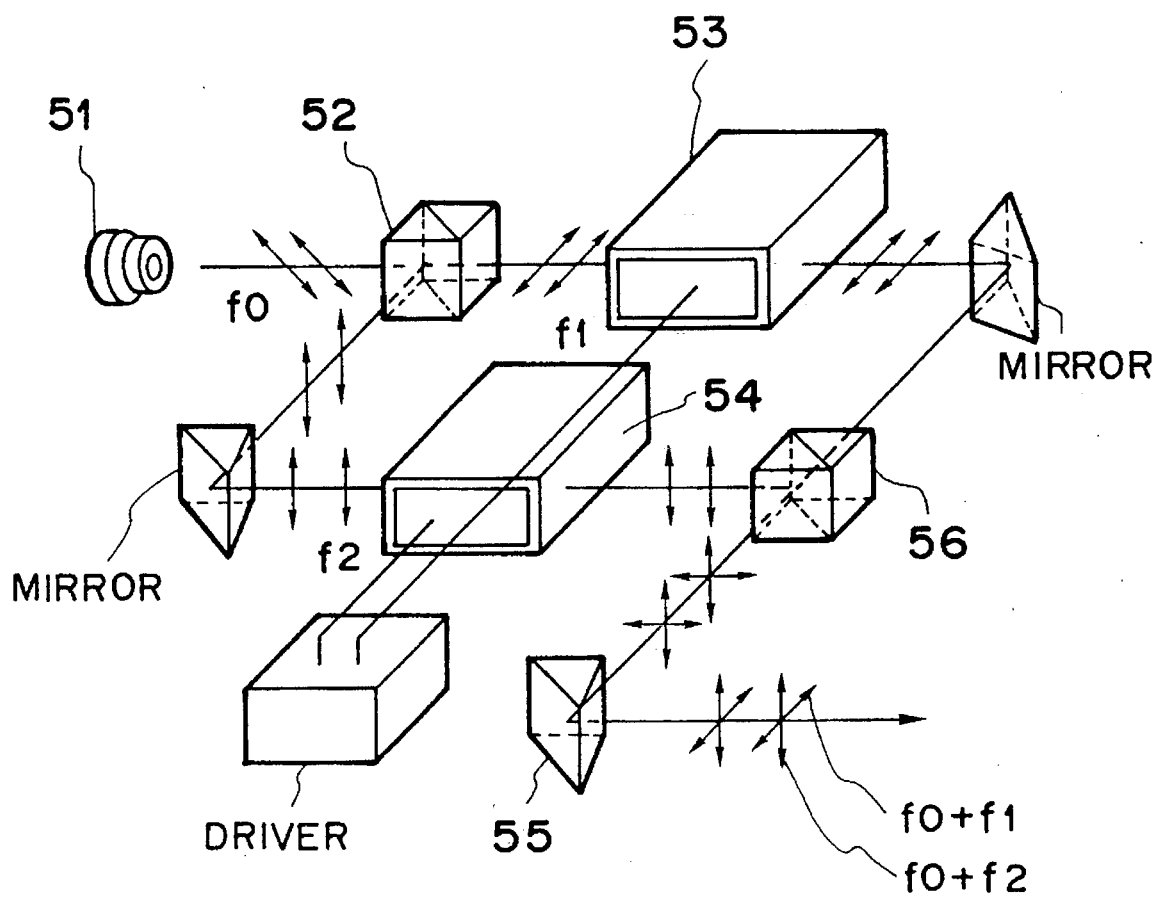
FIG. 1 is a schematic view of a light heterodyne interference apparatus according to the prior art.
Figure 2:
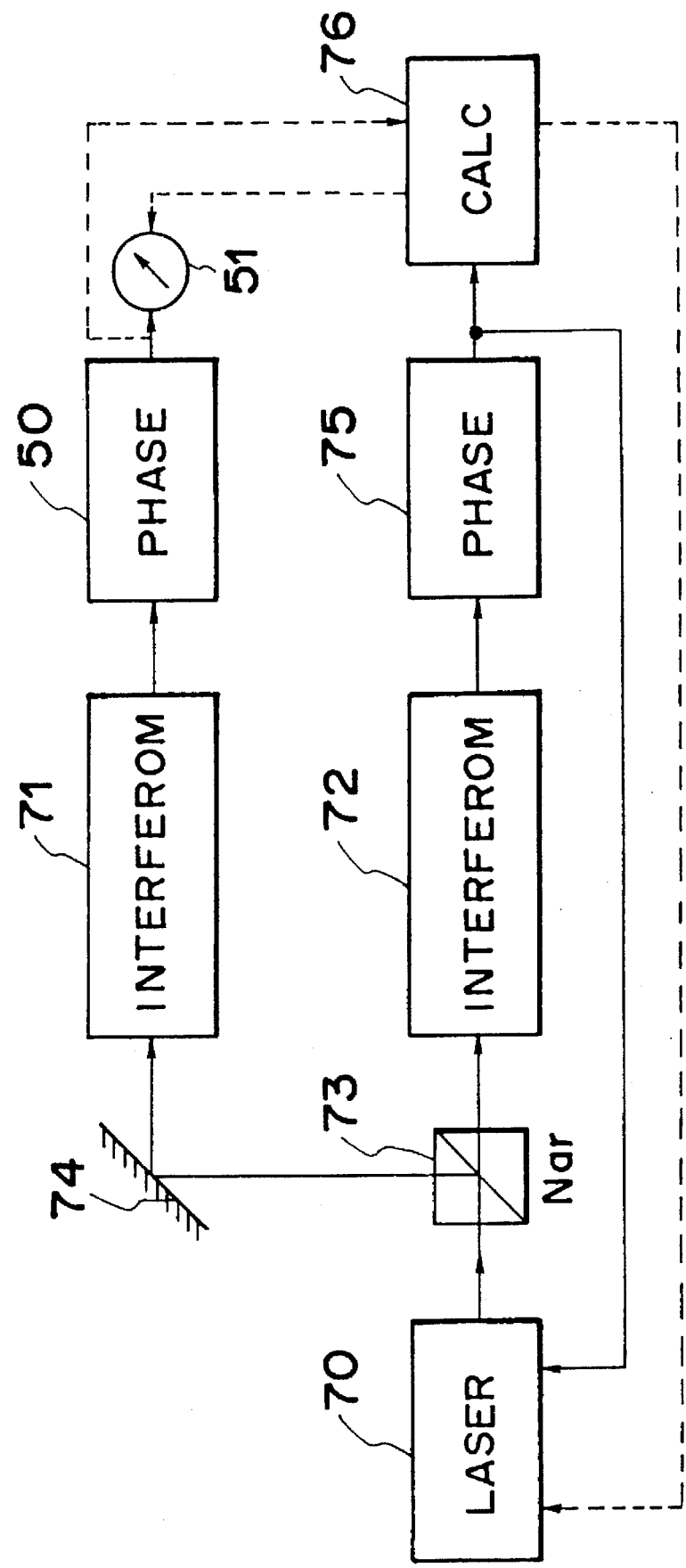
FIG. 2 is a block diagram of the essential portions of an interference apparatus according to the prior art.
Figure 3:
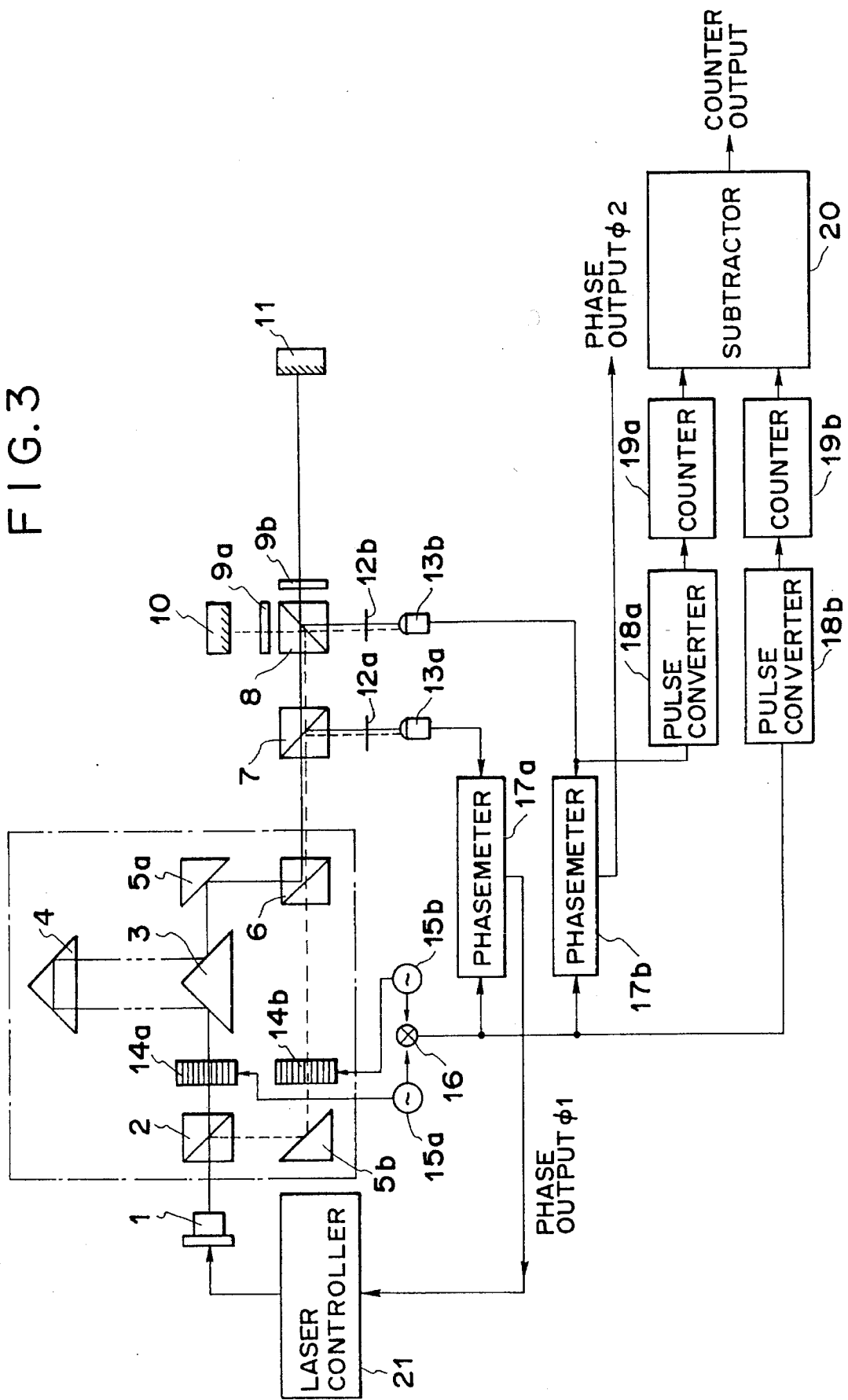
FIG. 3 is a schematic diagram of the essential portions of a first embodiment of the present invention.

FIG. 3 is a schematic diagram of the essential portions of a first embodiment of the present invention as it is applied to a light wave interference apparatus. The present embodiment is shown with respect to a case where the amount of movement of a mirror 11 as an object to be measured is measured.

In FIG. 3, the reference numeral 1 designates light source means comprising, for example, a semiconductor laser (wavelength $\lambda_0$ and frequency $f_0$) whose oscillated wavelength is controllable. Linearly polarized light inclined at 45° with respect to the plane of the drawing sheet is oscillated from the light source means 1. The reference numeral 2 denotes a light divider comprising a polarizing beam splitter for dividing the incident light beam from the light source means 1 into two linearly polarized lights orthogonal to each other. Of these two lights, the light beam passed through the light divider 2 is caused to enter an AO modulator 14a and the light beam reflected by the light divider 2 is caused to enter an AO modulator 14b via a mirror 5b.

In the AO modulator 14a, a carrier signal is received from a highly stable oscillator 15a and a shift of frequency $f_1$ is imparted to the incident light, and light of frequency $f_0+f_1$ is caused to emerge. In the AO modulator 14b, a carrier signal is received from a highly stable oscillator 15b and a shift of frequency $f_2$ is imparted to the incident light, and light of frequency $f_0+f_2$ is caused to emerge. The light from the AO modulator 14a is passed through a predetermined optical path via two prism reflecting mirrors 3 and 4 as optical path length difference imparting means, whereafter it is directed to a polarizing beam splitter as a light combining device 6 via a mirror 5a.

On the other hand, the light from the AO modulator 14b is intactly caused to enter the light combining device 6, whereby the two light beams are combined. The light beam emerging from the light combining device 6 at this time is linearly polarized lights having two kinds of frequencies $f_0+f_1$ and $f_0+f_2$ and orthogonal to each other.

The reference numeral 16 designates an RF mixer circuit which takes out the difference frequency between high frequency signals and transmits it to phase meters 17a and 17b which will be described later.

Part of the light beam from the light combining device 6 is used as detection light and is reflected and divided by a non-polarizing beam splitter 7, and linearly polarized lights orthogonal to each other are caused to interfere with each other through a polarizing plate 12a of an azimuth 45° and the interference light is detected by a photodetector 13a as a photoelectric detector.

A first beat signal is obtained in the photodetector 13a at this time. Also, the beat signal obtained at this time includes information based on a variation in the oscillated wavelength from the light source means 1 as described in connection with a measurement sequence which will be described later. The signal from the photodetector 13a detects the phase difference between two synchronizing signals by the phase meter 17a, and transmits the result to a laser controller 21. The laser controller 21 controls an electric current entering the semiconductor laser 1 and controls the oscillated wavelength.

The highly stable oscillators 15a and 15b arrive at the AO modulators 14a and 14b, respectively, and part of the outputs of the highly stable oscillators 15a and 15b at this time is input to the RF mixer 16.

On the other hand, the light beam passed through and divided by the non-polarizing beam splitter 7 is caused to enter a polarizing beam splitter 8 as measuring light.

Of the light which has entered the polarizing beam splitter 8, the linearly polarized light of frequency $f_0+f_1$ passes through this beam splitter, passes through a quarter wavelength plate 9b, becomes circularly polarized light and is reflected by the mirror 11 as the object to be measured. This light again passes through the quarter wavelength plate 9b and becomes linearly polarized light whose plane of polarization differs by 90° from that of the aforementioned linearly polarized light, and is now reflected by the polarizing beam splitter 8.

On the other hand, of the light which has entered the polarizing beam splitter 8, the linearly polarized light of frequency $f_0+f_2$ is reflected by this beam splitter and passes through a quarter wavelength plate 9a and becomes circularly polarized light, and is reflected by a reference mirror 10. This light again passes through the quarter wavelength plate 9a and becomes linearly polarized light whose plane of polarization differs by 90° from that of the aforementioned linearly polarized light, and now passes through the polarizing beam splitter 8.

Then, the linearly polarized light of frequency $f_0+f_1$ and the linearly polarized light of frequency $f_0+f_2$ are combined again by the polarizing beam splitter 8 and made into a light beam, which is passed through a polarizing plate 12b, whereafter it is made into circularly polarized lights, which are caused to interfere with each other, and the interference light is detected by a photodetector 13b, whereby a second beat signal is obtained. The second beat signal is input to a phase meter 17b.

On the other hand, parts of the outputs from the highly stable oscillators 15a and 15b which are driving the AO modulators 14a and 14b are mixed by the RF mixer 16, whereby a third beat signal is obtained. The third beat signal is input to the phase meters 17a and 17b.

The reference characters 18a and 18b denote pulse converters which convert a sine wave into a pulse. The reference characters 19a and 19b designate counters which integrate the pulse numbers from the pulse converters 18a and 18b. The reference numeral 20 denotes a subtractor which subtracts the integrated pulses of the counters 19a and 19b and takes out the difference therebetween.

The subtracted pulse count output thus obtained by effecting subtraction provides a counter output indicative of the amount of movement of the mirror 11.

In the present embodiment, the elements from the light divider 2 to the light combining device 6 which are encircled by a dot-and-dash line are placed on a material of a small coefficient of thermal expansion, for example, a material of a coefficient of linear expansion of $1\times10^{-5}/°C$. or less such as invar, superinvar, low thermal expansion casting, low thermal expansion glass ceramics or quartz glass. Thereby the positional relations between the elements are prevented from being varied by thermal influence.

The measurement sequence of the present embodiment will now be described.

Any variation in the phase of the first beat signal obtained by the photodetector 13a with the third beat signal obtained by the RF mixer 16 as a reference is measured by the phase meter 17a, and a phase output $\phi_1$ is taken out. At this time, from the phase output $\phi_1$, there is obtained a phase fluctuation $\Delta\phi_1$ determined by the relation that $$\Delta\phi_1 = 2\pi \cdot \frac{\Delta\lambda}{\lambda_0^2} \cdot L', \tag{1}$$

where L' is the optical path difference between the length of the optical path along which the two lights divided by the polarizing beam splitter 2 pass through the route indicated by solid line to the photodetector 13a and through the route indicated by broken line to the photodetector 13a.

Here, $\Delta\lambda$ is the variation in the oscillated wavelength from the light source means 1, and $\lambda_0$ is the oscillated wavelength. Thus, if the optical path difference L' is physically stable, the phase fluctuation $\Delta\phi_1$ gives the information of the amount of fluctuation of the wavelength of the light source means 1, and if this information is fed back to the laser controller 21, the oscillated wavelength from the light source means 1 can be stabilized.

If this wavelength-stabilized light is used as measuring light, any variation in the phase of the second beat signal obtained by the photodetector 13b with the third beat signal as a reference can be measured by the phase meter 17b and a phase output $\phi_2$ can be obtained, whereby the minute amount of movement of the mirror 11 as the object to be measured can be read. If for example, the oscillated wavelength from the light source means 1 is 780 nm and the resolving power of the phase meter is 0.1° there will be obtained a resolving power of about 0.1 nm. Also, if the second beat signal and the third beat signal are made into pulses by the pulse converters 18a and 18b, respectively, and the pulse numbers are counted by the counters 19a and 19b and the subtraction of the pulses is efffected by the subtractor 20, the great amount of movement of the mirror 11 can be obtained as the difference between the pulse numbers by Doppler effect.

As described in the present embodiment, design is made such that in the portion wherein the light beam is separated into two light beams to form beat signals and a frequency difference is given to these two light beams, an optical path length difference is also given and therefore, the construction is simple. That is, as compared with a case where a discrete reference interferometer is provided at a location separate from this portion, the number of members including light beam separating means can be reduced.

Figure 4:
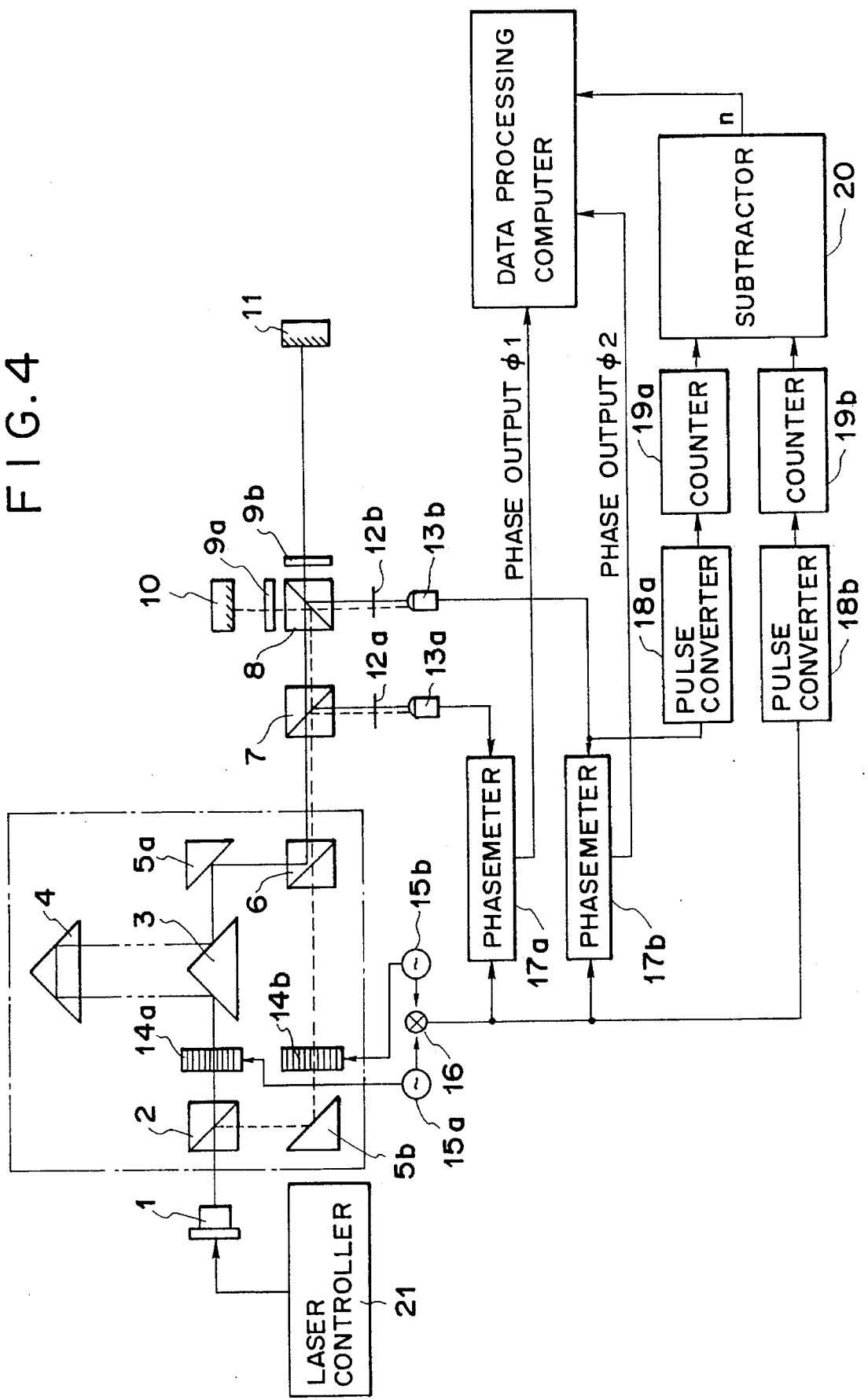
FIG. 4 is a schematic diagram of the essential portions of a second embodiment of the present invention.

FIG. 4 is a schematic diagram of the essential portions of a second embodiment of the present invention. This embodiment differs from the first embodiment of FIG. 3 in that a data processing computer 22 is newly added, that the outputs of the phase meters 17a, 17b and the subtractor 20 are input to the data processing computer 22 and that the output of the phase meter 17a is not fed back to the laser controller 21. In the other points, this embodiment is the same as the first embodiment.

In the present embodiment, data obtained by the phase meters 17a and 17b, i.e., phase outputs $\phi_1$ and $\phi_2$, and the output from the subtractor 20 are all collected in the data processing computer 22. As regards the information of the movement of the mirror 11 as the object to be measured, the phase output $\phi_2$ and the output from the subtractor 20 are corrected by the data of the phase output $\phi_1$. Thereby, any fluctuation of the oscillated wavelength from the light source means 1 is corrected, whereby highly accurate detection is always made possible.

When for example, there is no correction, the distance L is calculated as $$L = \frac{\lambda_0}{2} \left( n + \frac{\phi_2}{2\pi} \right) \quad (2)$$

and if $\lambda_0$ is not definite, a great measurement error of L will occur, but from equation (1), if by the use of a value $$\Delta\lambda = \frac{\Delta\phi_1}{2\pi L'} \lambda_0^2, \quad (3)$$

L is calculated as $$L = \frac{\lambda_0 + \Delta\lambda}{2} \left( n + \frac{\phi_2}{2\pi} \right), \quad (4)$$

there will be obtained an accurate value in which the fluctuation of the wavelength has been corrected. In equation (3), n is the output value of the subtraction counter, and $\phi_2$ is the output of the phase meter 17b.

Figure 5:
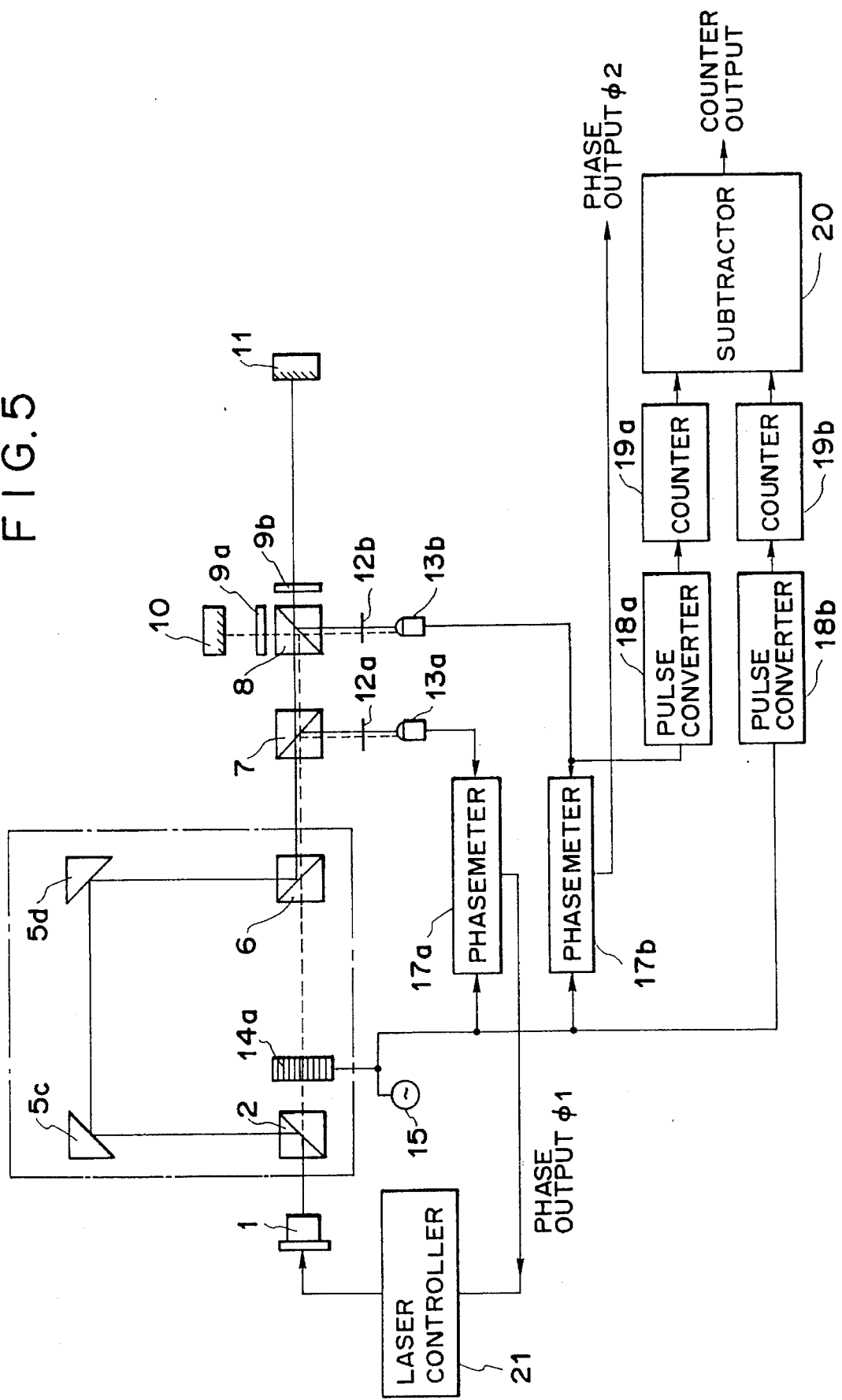
FIG. 5 is a schematic diagram of the essential portions of a third embodiment of the present invention.

FIG. 5 is a schematic diagram of the essential portions of a third embodiment of the present invention. In the present embodiment, as compared with the embodiment of FIG. 3, the prism reflecting mirrors 3, 4, the AO modulator 14b and the RF mixer 16 are eliminated.

That is, in the present embodiment, the light emitted from the light source means 1 is divided into two lights by the polarizing beam splitter 2 as a light divider, whereafter one of the two lights is caused to travel straight and is subjected to frequency shift through the AO modulator 14a, whereafter it is caused to enter the polarizing beam splitter 6 as a light combining device. The other light is caused to pass through a predetermined optical path by the prism reflecting mirrors 5c and 5d, whereafter it is caused to enter the polarizing beam splitter 6. In this point, the present embodiment differs from the first embodiment, and in the other points, the present embodiment is the same as the first embodiment.

In the present embodiment, only one AO modulator of usually 20 MH$_z$–100 MH$_z$ intactly provides a beat is used and therefore, a high frequency shift amount signal frequency and thus, use is made of the frequency characteristic of the electric circuit of the phase meter which corresponds to the beat signal.

FIG. 6 is a schematic diagram of the essential portions of a fourth embodiment of the present invention.

The present embodiment differs from the first embodiment of FIG. 3 in that a prism reflecting mirror 5f, non-polarizing beam splitters 23a, 23b, a polarizing plate 12c and a photodetector 13C are newly added, that the RF mixer 16 is eliminated, and the manner in which the optical path divided by the polarizing beam splitter 2 returns to the polarizing beam splitter 6, i.e., the construction of the optical path length difference imparting means.

In the present embodiment, the light emitted from the light source means 1 is divided into first and second linearly polarized lights L1 and L2 whose two directions of polarization are orthogonal to each other by the polarizing beam splitter 2. Of these lights, the first light L1 is subjected to frequency shift by the AO modulator 14a, and is divided into third and fourth lights L3 and L4 by the non-polarizing beam splitter 23a.

Also, the second light L2 is divided into fifth and sixth lights L5 and L6 via the prism reflecting mirror 5b and the AO modulator 14b and by the non-polarizing beam splitter 23b. The fourth light L4 and the sixth light L6 are caused to interfere with each other through the polarizing plate 12c, and the interference light is detected by the photodetector 13c to thereby obtain a beat signal. Design is made such that at this time, there is no optical path difference between the fourth light L4 and the sixth light L6. The third light L3 travels toward the polarizing beam splitter 6, and the fifth light L5 also travels toward the polarizing beam splitter 6 via the prism reflecting mirror 5f, and the third light L3 and the fifth light L5 are combined and the combined light is caused to emerge as measuring light.

Since the optical path difference L' in equation (1) is 0, the beat signal obtained in the photodetector 13c provides the reference signal of the phase meters 17a, 17b as a fiducial signal which is not affected by the fluctuation of the wavelength from the light source means 1. Therefore, the RF mixer circuit used in the first embodiment is unnecessary.

According to the present invention, as described above, there can be achieved a wavelength variation measuring apparatus suitable for an interference apparatus in which a predetermined optical path length difference is imparted to two light beams given a frequency difference, whereafter the light beams are divided and the two light beams are combined, and part of these light beams is used for feedback control for stabilizing the wavelength or for the correction of a measurement error, whereby without using an interferometer exclusively for stabilizing the wavelength, there is easily obtained a signal for stabilizing the wavelength or a measurement data correction signal by a variation in the wavelength and light wave interference is possible.

What is claimed is:

1. A wavelength variation detecting apparatus comprising:

light source means;

light dividing means for dividing a light beam from said light source means into two light beams;

frequency difference imparting means for causing a frequency difference between said two light beams comprising acoustooptic elements disposed in paths of the two light beams divided by said light dividing means, respectively;

geometrical length difference between optical paths imparting means for causing a geometrical length difference between optical paths of said two light beams, the geometrical length difference between optical paths caused by said geometrical length difference imparting means being substantially constant at least during detection of any variation in the wavelength of said light source means;

light combining means for combining said two light beams between which the frequency difference and the geometrical length difference are imparted; and photoelectric detection means for detecting a beat signal in the combined beams of constant geometrical length difference between optical paths; and means for detecting any variation in the wavelength of said light source means by using a result of the detecting of the beat signal in the combined beams of constant geometrical length difference between optical paths performed by said photoelectric detection means.

2. A wavelength variation detecting apparatus according to claim 1, wherein said light dividing means, said frequency difference imparting means, said geometrical length difference optical paths imparting means, and said light combining means are placed on one and the same base plate having a coefficient of thermal expansion of $1 \times 10^{-5}/°C$. or less.

3. A wavelength variation detecting apparatus according to claim 2, wherein the material of said base plate is one or a compound of invar, superinvar, low thermal expansion casting, low thermal expansion glass, ceramics and quartz glass.

4. A wavelength variation detecting apparatus according to claim 1, wherein said frequency difference imparting means has shifting means capable of shifting the light frequency to the optical path of at least one of the two light beams from said light dividing means.

5. A wavelength variation detecting apparatus according to claim 1, wherein said light source means is provided with a semiconductor laser.

6. An apparatus according to claim 1, wherein the means for detecting any variation includes comparing means for comparing the beat signal with a beat signal which substantially corresponds to the frequency difference caused by said frequency difference imparting means so as to detect the variation in the wavelength of said light source means.

7. A wavelength variation stabilizing apparatus comprising:

a light source whose wavelength is controllable;

a light divider for dividing a light beam from said light source into two light beams;

a frequency difference imparting device for causing a frequency difference between said two light beams comprising acoustooptic elements disposed in paths of the two light beams divided by said light divider respectively;

a geometrical length difference between optical paths imparting device for causing a geometrical length difference between optical paths of said two light beams, the geometrical length difference between optical paths caused by said geometrical length difference between optical paths imparting device being substantially constant at least during detection of any variation in the wavelength of said light source;

a light combining device for combining said two light beams between which the frequency difference and the geometrical length difference are imparted;

a photoelectric detector for detecting a beat signal in the combined beams of constant geometrical length difference between optical paths;

a variation detector for detecting any variation in the wavelength of said light source by using a result of detecting of the beat signal in the combined beams of constant geometrical length difference between optical paths performed by said photoelectric detector; and feedback control means for controlling feedback to said light source on the basis of said variation detector and stabilizing the wavelength of said light source.

8. An apparatus according to claim 7, wherein said variation detector comparing device for comparing the beat signal with a beat signal which substantially corresponds to the frequency difference caused by said frequency difference imparting device so as to detect the variation in the wavelength of said light source.

9. A correcting apparatus comprising:

a light source;

a light divider for dividing a light beam from said light source into two light beams;

a frequency difference imparting device for causing a frequency difference between said two light beams;

geometrical length difference between optical paths imparting device for causing geometrical length difference between optical paths of said two light beams, the geometrical length difference between optical paths caused by said geometrical length difference optical paths imparting device being substantially constant at least during detection of any variation in the wavelength of said light source;

a light combining device for combining said two light beams between which the frequency difference and the geometrical length difference are imparted;

a photoelectric detector for detecting a beat signal in part of the combined beams of constant geometrical length difference between optical paths to thereby detect any variation in the wavelength of said light source, the rest of the combined beams being directed to an object to be measured for obtaining measurement data; and variation detector for detecting any variation in the wavelength of said light source by using a result of detecting the beat signal in the combined beams of constant geometrical length difference between optical paths performed by said photoelectric detector:

the measurement data obtained by the rest of said combined beams being corrected with a signal from a variation detector as a measurement data correction signal.

10. An apparatus according to claim 9, wherein said variation detector includes a comparing device for comparing the beat signal with a beat signal which substantially corresponds to the frequency difference caused by said frequency difference imparting device so as to produce a signal for correcting the variation in the wavelength of said light source.

11. A wavelength variation detecting apparatus comprising:

light source means;

light dividing means for dividing a light beam from said light source means into two light beams;

frequency difference imparting means for causing a frequency difference between said two light beams;

geometrical length difference between optical paths imparting means for causing a geometrical length difference between optical paths of said two light beams; and light combining means for combining said two light beams between which the frequency difference and the geometrical length difference are imparted, part of said combined beams being guided to an interference optical system, wherein a beat signal in the rest of said combined beams which is divided from the part in an optical path between said light combining means and the interference optical system is detected to thereby detect any variation in the wavelength of said light source means.

12. An apparatus according to claim 11, wherein the optical path length difference caused by said optical path length difference imparting means is substantially constant at least during detection of any variation in the wavelength of said light source means.

13. An apparatus according to claim 11, further comprising comparing means for comparing the beat signal with a beat signal which substantially corresponds to the frequency difference caused by said frequency difference imparting means so as to detect the variation in the wavelength of said light source means.

14. A wavelength variation detecting method comprising:

an illuminating step of providing an illuminating light beam from a light source;

a light dividing step of dividing the light beam from said light source into two light beams;

a frequency difference imparting step of causing a frequency difference between said two light beams using acoustooptic elements disposed in paths of the two light beams divided in said light dividing step, respectively;

geometrical length difference between optical paths imparting step of causing a geometrical length difference between optical paths of said two light beams, the geometrical length difference between optical paths caused by said geometrical length difference between optical paths imparting step being substantially constant at least during detection of any variation in the wavelength of said light source;

a light combining step of combining said two light beams between which the frequency difference and the geometrical length difference are imparted; and a photoelectric detecting step of detecting a beat signal in the combined beams of constant geometrical length difference; and a variation detection step of detecting any variation in the wavelength of said light source by using a result of detecting the beat signal in the combined beams of constant geometrical length difference between optical paths performed in said photoelectric detecting step.

15. A method according to claim 14, wherein said variation detecting step includes a comparing step of comparing the beat signal with a beat signal which substantially corresponds to the frequency difference caused in said frequency difference imparting step so as to detect the variation in the wavelength of said light source.

* * * * *

UNITED STATES PATENT AND TRADEMARK OFFICE
CERTIFICATE OF CORRECTION

PATENT NO. : 5,493,395

DATED : February 20, 1996

INVENTOR : MASARU OTSUKA

It is certified that error appears in the above-identified patent and that said Letters Patent is hereby corrected as shown below:

On drawings

SHEET 3 of 6

FIG. 3  "SUBTRACTOR" should read --SUBTRACTER--.

SHEET 4 of 6

FIG. 4  "SUBTRACTOR" should read --SUBTRACTER--.

SHEET 5 of 6

FIG. 5  "SUBTRACTOR" should read --SUBTRACTER--.

SHEET 6 of 6

FIG. 6  "SUBTRACTOR" should read --SUBTRACTER--.

COLUMN 6

Line 11,  "modulater of" should read --modulator is used and therefore, a high frequency shift amount of--;

UNITED STATES PATENT AND TRADEMARK OFFICE
CERTIFICATE OF CORRECTION

PATENT NO. : 5,493,395

DATED : February 20, 1996

INVENTOR : MASARU OTSUKA

It is certified that error appears in the above-identified patent and that said Letters Patent is hereby corrected as shown below:

COLUMN 6

Line 12, "is used" should be deleted;
Line 13, "and therefore, a high frequencey shift amount" should be deleted.

COLUMN 7

Line 21, "imparted; and" should read imparted;--
Line 33, "ence" should read --ence between--.

COLUMN 8

Line 21, "detector" should read --detector includes a--;
Line 22, Close up left margin;

UNITED STATES PATENT AND TRADEMARK OFFICE
CERTIFICATE OF CORRECTION

PATENT NO. : 5,493,395

DATED : February 20, 1996

INVENTOR : MASARU OTSUKA

It is certified that error appears in the above-identified patent and that said Letters Patent is hereby corrected as shown below:

COLUMN 8

Line 56, "detector:" should read --detector;--;
Line 58, "from a" should read --from said--.

COLUMN 10

Line 19, "imparted; and" should read --imparted;--.

Signed and Sealed this

Ninth Day of July, 1996

BRUCE LEHMAN

Attest:

Attesting Officer

Commissioner of Patents and Trademarks